United States Patent [19]

Gearhart

[11] 4,386,722

[45] Jun. 7, 1983

[54] VEHICLE SPARE TIRE HOLDER

[76] Inventor: R. Nelson Gearhart, P.O. Box 415, Liberal, Kans. 67901

[21] Appl. No.: 266,445

[22] Filed: May 22, 1981

[51] Int. Cl.³ ............................................. B65D 43/04
[52] U.S. Cl. ............................ 224/42.23; 224/42.24; 414/463
[58] Field of Search ............... 224/42.23, 42.24, 42.25, 224/42.27, 42.29, 42.21, 42.28; 414/463, 465, 466

[56] References Cited

U.S. PATENT DOCUMENTS 2,913,159 11/1959 Sluder ............................ 224/42.23

Primary Examiner—Steven M. Pollard
Attorney, Agent, or Firm—Edwin H. Crabtree

[57] ABSTRACT

A vehicle spare tire holder for receiving and securing a spare tire on a wheel. The holder may be operated off of the vehicle's air system. Also, the holder may be mounted vertically behind the vehicle's cab or horizontally underneath a trailer pulled by a vehicle.

5 Claims, 4 Drawing Figures

VEHICLE SPARE TIRE HOLDER

BACKGROUND OF THE INVENTION

This invention relates to a vehicle tire holder and more particularly but not by way of limitation to an air operated spare tire holder for mounting on a truck tractor and trailer.

Heretofore, there have been different types of spare tire holders such as those described in U.S. Pat. No. 1,947,820 to Alborn, U.S. Pat. No. 2,420,854 to Black, and U.S. Pat. No. 2,913,159 to Sluder.

None of these above-mentioned patents disclose the unique structure and advantages of the subject invention.

SUMMARY OF THE INVENTION

The vehicle spare tire holder is simple in design, rugged in construction and is readily adaptable for securing various size tires and wheels to different types of vehicles such as a truck tractor and trailer.

The holder may be mounted vertically behind the tractor's cab or horizontally on or underneath a trailer or on any other suitable mounting place.

The holder is designed to prevent the spare tire and wheel from falling or bouncing off the vehicle or trailer. Also, the holder prevents the theft of an expensive spare tire and wheel.

The vehicle air system can be used for applying air pressure to the holder and not until the air pressure is applied can the tire and wheel be removed. Therefore, should the vehicle's air system leak air pressure, the holder is not affected and the spare tire and wheel can not be removed.

The spare tire holder for receiving and securing a spare tire and wheel includes a frame adapted for receiving the spare tire and wheel thereon. An air operated cylinder is mounted on the frame. The cylinder includes a push rod extending outwardly from the cylinder when air pressure is applied to the cylinder. The cylinder also includes a spring mounted therein for biasing the push rod inwardly into the cylinder when the air pressure is relieved from the cylinder. An angular shaped cross bar extends across the diameter of the wheel opening and includes a pair of studs mounted on the opposite ends of the bar for receipt in the wheel lug openings. Attached to the bar is a pair of arms tapered downwardly for receipt through the wheel opening. A connector bar is attached to the opposite end of the arms for releasably engaging the push rod of the air operated cylinder.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
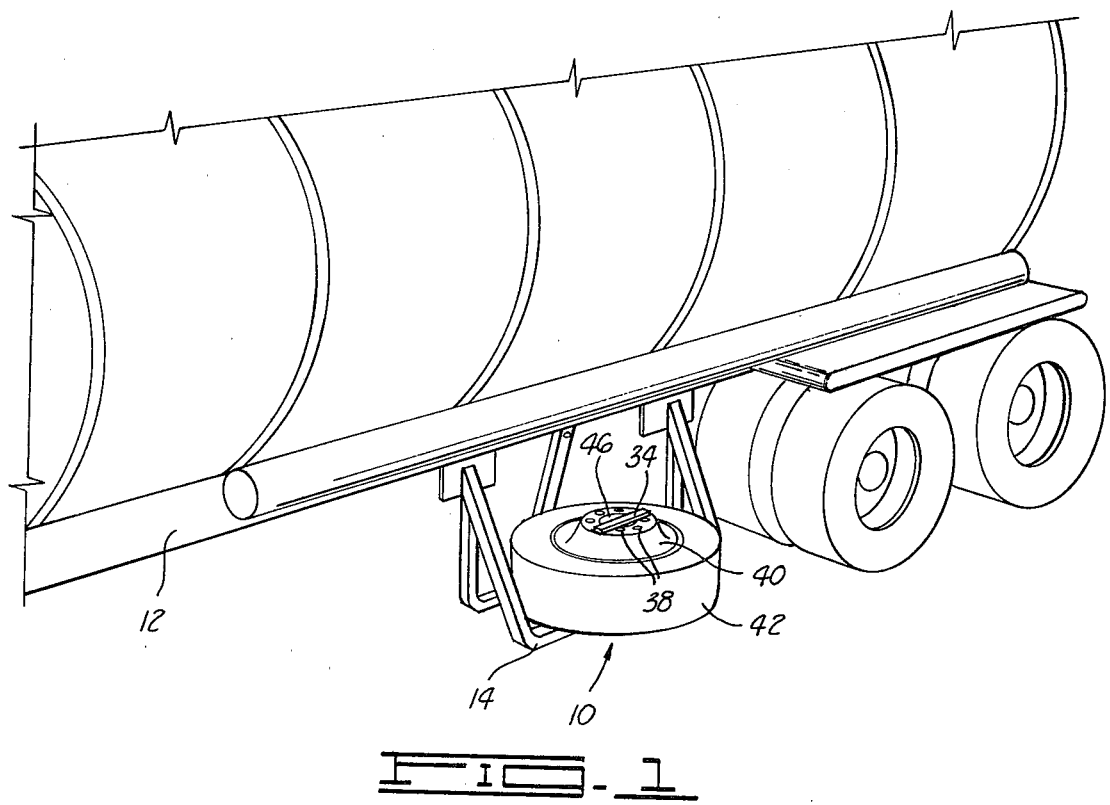
FIG. 1 is a perspective view of the vehicle spare tire holder mounted on a frame underneath a trailer.

In FIG. 1 a perspective view of the vehicle spare tire holder is shown and designated by general reference numeral 10. In this illustration, the holder 10 is mounted underneath a portion of a trailer 12. It should be noted that while the trailer 12 is shown, the holder 10 could also be mounted on top of a flatbed trailer, vertically behind the cab of the truck tractor, or any other convenient place on a vehicle.

Figure 2:
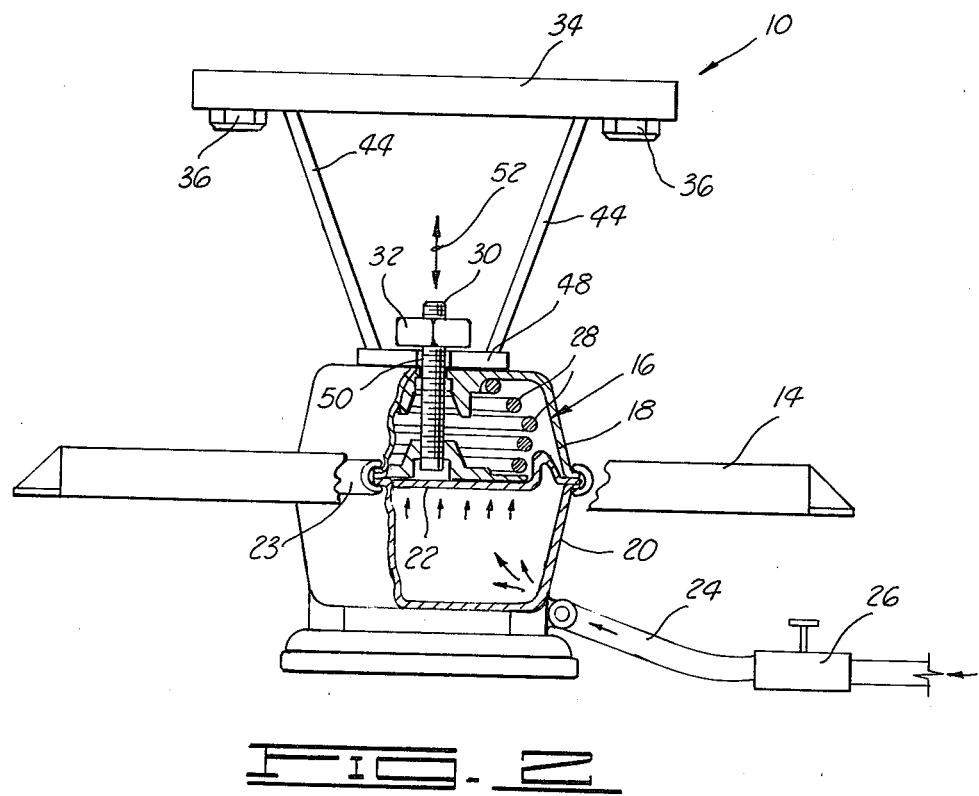
FIG. 2 is a front view of the spare tire holder with a portion of the air cylinder cut away.

Referring now to both FIG. 1 and FIG. 2, the holder 10 includes a frame 14 for mounting an air operated cylinder 16 thereon. The air operated cylinder 16 includes an upper housing 18 and a lower housing 20 divided by a flexible diaphragm 22 with the housing held together by a clamp 23. The lower housing 20 is communicably connected to an air line 24 having a valve 26 therein. The air line 24 may be hooked to the vehicles air system for applying pressure inside the lower cylinder 20. The air pressure is typically in a range from 75 to 160 psi. In the upper housing 18 is mounted a coil spring 28 attached to a push rod 30 having a push rod nut 32 which is adjustable along the length of the rod 30. When the air pressure is relieved inside the lower housing 20, the bias force of the spring 28 urges the push rod 30 inwardly into the upper housing 18 moving the flexible diaphragm 22 downwardly into the lower housing 20. Likewise, when the air pressure is applied to the lower housing 20, the bias force of the coil spring 28 is overcome and the push rod 30 is urged outwardly from the upper housing 18.

An angular shaped cross bar 34 is mounted on top of the air cylinder 16 and includes a pair of studs 36 mounted at the ends of the bar 34. The studs 36 are used for receipt inside wheel lug opening 38 in a wheel 40 having a tire 42 mounted thereon. Extending downwardly from the bar 34 are a pair of tapered arms 44 which extend through an opening 46 in the center of the wheel 40. Joining together the ends of the arm is a connector bar 48 having a slot 50 therein.

Arrow 52 represents the upward and downward movement of the push rod 30. It can be appreciated when sufficient air pressure is received inside the lower housing 20, the air pressure against the diaphragm 22 moves the push rod 30 upwardly from the top of the upper housing 18. At this time sufficient room is provided for the connector bar 48 to be placed on top of the upper housing 18 with the slot 50 received around the push rod 30 and below the push rod nut 32. While the wheel 40 and tire 42 are not shown in FIG. 2, it can be appreciated that the tapered arms 44 at this time are received through the opening 46 and the studs 36 are received in two of the lug openings 38. When this has been accomplished with the slot 50 received around the push rod 30, the air pressure is relieved from the lower housing 20 and the bias force of the spring 28 urges the push rod 30 downwardly with the push rod nut 32 bearing on top of the connector bar 48 and the cross bar 34 securing the wheel 40 and tire 42 on top of the frame 14.

Figure 3:
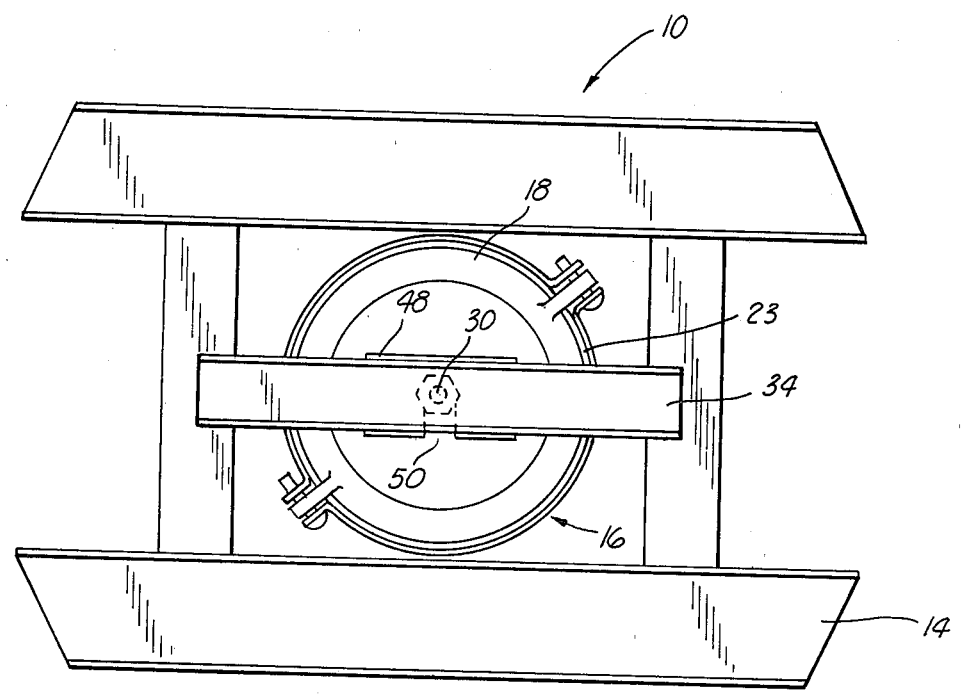
FIG. 3 is a top view of the spare tire holder.

In FIG. 3 a top view of the tire holder 10 is shown. In this view the air cylinder 16 can be seen disposed on the frame 14 with the slot 50 shown in dotted lines received around the push rod 30. FIG. 3 does not show the wheel 40 and tire 42 but it can be appreciated that applying air pressure to the air cylinder 18 and moving the push rod 30 upwardly with the push rod nut 32 moved away from the top of the connector bar 48, the cross bar 34 along with the tapered arms 44 and connector bar 48 can quickly be removed so the tire 42 and wheel 40 can be placed on top of the frame 14. The tapered arms 44 are then inserted through the opening 46 of the wheel 40 and the slot 50 inserted around the push rod 30 in preparation of relieving the air from the lower housing 20. The push rod nut 32 is then lowered on top of the connector bar 48 thereby securing the wheel 40 and tire 42 to the frame 14.

Figure 4:
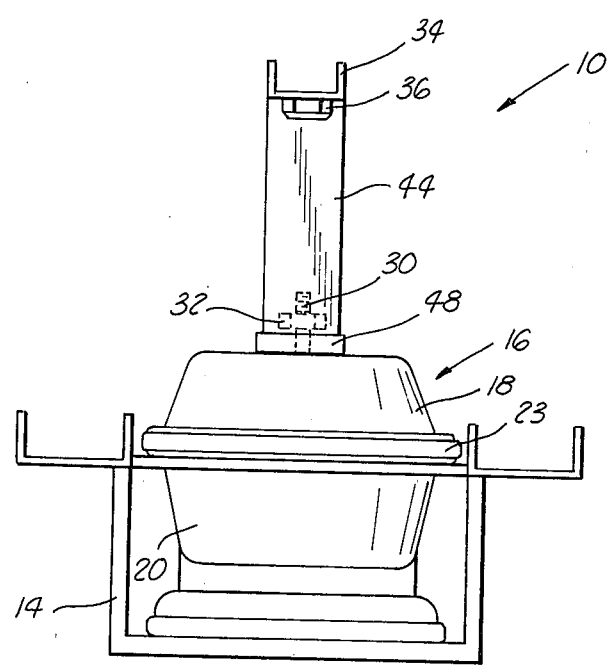
FIG. 4 is an end view of the spare tire holder.

In FIG. 4 a side view of the tire holder 10 shown with the air cylinder 16 mounted on top of the frame 14. The push rod 30 with push rod nut 32 is shown in dotted lines with the nut 32 extended slightly above the connector bar 48 so the connector bar 48 can be released from the push rod 30 for receiving the wheel 40 on top of the frame 14 with the arms 44 inserted through the opening 46.

It can be appreciated from reviewing FIGS. 1, 2, 3 and 4 that the subject invention is unique in design and is unlike prior art tire holders where air pressure is applied to release the tire and wheel, the subject invention secures the tire and wheel when air pressure is relieved from the system. Therefore, should there be a leak in the vehicle's air system or for any other reason the air pressure is relieved from the lower housing 20, the bias force of the spring 28 holds the tire 42 and wheel 40 in place and it cannot be removed until air pressure is again applied to the lower housing 20 and the bias force of the spring 28 is overcome.

Changes may be made in the construction and arrangement of the parts or elements of the embodiments as described herein without departing from the spirit or scope of the invention defined in the following claims.

What is claimed is:

1. A vehicle spare tire holder for receiving and securing a spare tire mounted on a wheel, the tire holder comprising:
a frame adapted for receiving the spare tire and wheel thereon;
an air operated cylinder mounted on the frame, the cylinder having a push rod extending outwardly therefrom when air pressure is applied to the cylinder;
wheel gripping means for engaging the sides of the wheel, a portion of the gripping means received through the center of the wheel releasably attached to the push rod, the wheel gripping means securing the tire and wheel on the frame when air pressure is relieved from the air cylinder.

2. The tire holder as described in claim 1 wherein the air operated cylinder includes a spring for biasing the push rod inwardly into the cylinder when the air pressure is relieved from the cylinder, when the air pressure is applied to the cylinder the bias force of the spring is overcome and the push rod is extended outwardly from the cylinder for releasably engaging the wheel gripping means.

3. The tire holder as described in claim 1 wherein the air operated cylinder is adapted for receiving air pressure from the vehicle's air system.

4. The tire holder as described in claim 1 wherein the wheel gripping means includes a cross bar extending across the diameter of the wheel opening with a pair of studs mounted on the opposite ends of the bar adapted for receipt in wheel lug openings of the wheel, the wheel gripping means further including a pair of arms attached at one end to the cross bar, the arms tapered downwardly for receipt through the wheel opening and a connector bar attached to the opposite ends of the arms, the connector bar releasably engaging the push rod.

5. A vehicle spare tire holder for receiving and securing a spare tire and wheel on the vehicle, the tire holder comprising:
a frame adapted for receiving the spare tire and wheel thereon;
an air operated cylinder mounted on the frame, the cylinder having a push rod extending outwardly therefrom when air pressure is applied to the cylinder, the cylinder further including a spring mounted therein for biasing the push rod inwardly into the cylinder when the air pressure is relieved from the cylinder; and
wheel gripping means for engaging the sides of the wheel, a portion of the gripping means received through the center of the wheel and releasably engaging the push rod, the wheel gripping means securing the tire and wheel on the frame when the air pressure is relieved from the air cylinder and the spring therein baises the push rod inwardly into the cylinder.

* * * * *